(12) United States Patent
Midwinter

(10) Patent No.: US 10,976,724 B2
(45) Date of Patent: Apr. 13, 2021

(54) MACHINING ERROR COMPENSATION USING ARTEFACT BASED OFFSETS

(71) Applicant: ROLLS-ROYCE plc, London (GB)

(72) Inventor: Phillip Midwinter, Derby (GB)

(73) Assignee: ROLLS-ROYCE plc, London (GB)

( * ) Notice: Subject to any disclaimer, the term of this patent is extended or adjusted under 35 U.S.C. 154(b) by 14 days.

(21) Appl. No.: 16/539,095

(22) Filed: Aug. 13, 2019

(65) Prior Publication Data
US 2020/0057427 A1    Feb. 20, 2020

(30) Foreign Application Priority Data
Aug. 16, 2018 (GB) ..................................... 1813372

(51) Int. Cl.
*G05B 19/4155* (2006.01)

(52) U.S. Cl.
CPC ............. *G05B 19/4155* (2013.01); *G05B 2219/36086* (2013.01)

(58) Field of Classification Search
CPC ............. G05B 19/404; G05B 19/401; G05B 2219/50063; G05B 2219/37008;
(Continued)

(56) References Cited

U.S. PATENT DOCUMENTS 3,986,010 A * 10/1976 Lankford ............ G05B 19/4163
                                              700/195
4,382,215 A *  5/1983 Barlow ............... G05B 19/4015
                                              318/568.1
(Continued)

FOREIGN PATENT DOCUMENTS

| EP | 0072687 A2 | 2/1983 |
| EP | 2 835 702 A1 | 2/2015 |
| GB | 2510965 A | 8/2014 |

OTHER PUBLICATIONS

Search Report of the Intellectual Property Office of the United Kingdom for GB1813372.8 dated Jan. 31, 2019.
(Continued)

*Primary Examiner* — Darrin D Dunn
(74) *Attorney, Agent, or Firm* — Oliff PLC

(57) ABSTRACT

The present disclosure concerns machine tools and more specifically compensation of variations which may occur within a multi-axis machine tool during a cutting process. An example embodiment includes a method of machining a workpiece using a machine tool comprising a machining head and a workpiece holder moveable relative to each another the method comprising: performing a first machining operation on a workpiece mounted to the workpiece holder according to a first programmed series of movements of the machining head relative to the workpiece holder, the first machining operation having a first maximum machining tolerance; performing a second machining operation on the workpiece according to a second programmed series of movements of the machining head relative to the workpiece holder, the second machining operation having a second maximum machining tolerance; performing a measurement operation to determine a position of an artefact on the machine tool; calculating an offset relative to a corresponding previously stored position of the artefact; and applying the offset to the second programmed series of movements prior to performing the second machining operation, wherein the second maximum machining tolerance is smaller than the first maximum machining tolerance.

10 Claims, 15 Drawing Sheets

(58) Field of Classification Search
CPC ........... G05B 2219/37345; G05B 2219/50087; G05B 2219/37574; G05B 2219/37575; G05B 2219/37577; G05B 2219/37573; G05B 2219/39019; G05B 19/4155; G05B 2219/36086; G05B 2219/49169; G05B 2219/49219; Y02P 90/02

See application file for complete search history.

(56) References Cited

U.S. PATENT DOCUMENTS

| | | | | |
|---|---|---|---|---|
| 4,428,055 | A * | 1/1984 | Zurbrick | G05B 19/4015 318/572 |
| 4,750,105 | A * | 6/1988 | Ohkawa | G05B 19/40937 700/86 |
| 4,899,094 | A * | 2/1990 | Pilborough | G05B 19/4015 318/567 |
| 5,021,941 | A | 6/1991 | Ford et al. | |
| 5,031,107 | A * | 7/1991 | Suzuki | B24B 19/12 700/186 |
| 5,117,169 | A * | 5/1992 | Kakino | G05B 19/401 318/578 |
| 5,189,624 | A * | 2/1993 | Barlow | G05B 19/41895 700/169 |
| 5,257,460 | A | 11/1993 | McMurtry | |
| 5,301,107 | A * | 4/1994 | Shimura | G06T 5/50 250/582 |
| 5,418,345 | A | 5/1995 | Adamski | |
| 5,473,532 | A * | 12/1995 | Unno | G05B 19/40937 700/32 |
| 5,562,526 | A * | 10/1996 | Yoneda | B24B 49/14 451/10 |
| 5,815,400 | A * | 9/1998 | Hirai | G05B 19/41875 700/173 |
| 6,269,284 | B1 | 7/2001 | Lau et al. | |
| 2002/0133268 | A1* | 9/2002 | Kato | G05B 19/401 700/193 |
| 2011/0307212 | A1 | 12/2011 | Nishikawa et al. | |
| 2012/0150354 | A1* | 6/2012 | Rogers | G05B 19/4015 700/279 |
| 2016/0054722 | A1 | 2/2016 | Jalluri et al. | |
| 2017/0045357 | A1* | 2/2017 | Lummes | G05B 19/401 |
| 2017/0315540 | A1* | 11/2017 | Nishioka | G05B 19/41875 |
| 2018/0058840 | A1* | 3/2018 | Lamendola | G01B 11/005 |
| 2018/0150049 | A1 | 5/2018 | Schranz et al. | |
| 2019/0383134 | A1* | 12/2019 | Turner | G01B 3/46 |
| 2020/0086444 | A1* | 3/2020 | Ido | B23Q 17/003 |
| 2020/0223002 | A1* | 7/2020 | Ferry | B23F 23/1225 |

OTHER PUBLICATIONS

Jan. 7, 2020 Extended Search Report issued in European Patent Application No. 19188916.1.

* cited by examiner

MACHINING ERROR COMPENSATION USING ARTEFACT BASED OFFSETS

CROSS-REFERENCE TO RELATED APPLICATIONS

This specification is based upon and claims the benefit of priority from UK Patent Application Number 1813372.8 filed on 16 Aug. 2018, the entire contents of which are incorporated herein by reference.

TECHNOLOGICAL FIELD

The present disclosure concerns machine tools and more specifically compensation of variations which may occur within a multi-axis machine tool during a cutting process.

BACKGROUND

Machining centres are machine tools augmented by other systems such as automatic tool changers, tool magazines or carousels, computer numerical control (CNC) capability, coolant systems, and enclosures. Thermally induced error ('thermal growth') is a major source of inaccuracy arising within machining centres. Such errors can arise due to heat generation in and around the machine structure, which may result in growth and tilt of the machine tool spindle and various other structural components of the machine tool relative to one another. This can give rise to a relative misalignment between the spindle and a workpiece. If not corrected, such misalignment will impact the fidelity between the actual machined workpiece and the intended workpiece structure as designed.

Thermal growth is typically controlled through the use of lubrication. The use of coolants can be problematic because the required ancillary components, such as chillers, contribute to low reliability and up-time of the machining centre. The machine tool itself may be designed to minimise the effects of heat generation within the machine structure, and control the gradient and change of environmentally encountered temperatures. To this effect, some machining centres utilise a temperature-controlled oil shower applied around the spindle area, where significant thermal growth is typically found. These are both examples of error avoidance techniques which may significantly increase the cost of constructing, installing and operating a machining centre.

U.S. Pat. No. 6,269,284 B1 discloses an error compensation technique, as opposed to an error avoidance technique, where real-time error correction is carried out based on a model of thermal effects occurring within the machine. However, such techniques require the installation of multiple sensitive thermal and position sensors within/on the machining centre, and maintenance of these sensors can prove problematic and time consuming. The machine characterisation associated with such techniques is also very time consuming as the model must be built up from a series of sensitive measurements. Further, the model may not be accurate or remain accurate for an intended period of time, which will result in an incorrect compensation being applied and loss of fidelity between the actual machined workpiece and the intended workpiece structure as designed.

BRIEF SUMMARY

According to a first aspect, there is provided a method of machining a workpiece using a machine tool comprising a machining head and a workpiece holder moveable relative to one another the method comprising: performing a first machining operation on the workpiece according to a first programmed series of movements of the machining head relative to the workpiece holder, the first machining operation having a first maximum machining tolerance; performing a second machining operation on the workpiece according to a second programmed series of movements of the machining head relative to the workpiece holder, the second machining operation having a second maximum machining tolerance; performing a measurement operation to determine a position of an artefact on the machine tool; calculating an offset relative to a corresponding previously stored position of the artefact; and applying the offset to the second programmed series of movements prior to performing the second machining operation, wherein the second maximum machining tolerance is smaller than the first maximum machining tolerance.

The step of performing the measurement operation may include moving the artefact to the previously stored position and measuring a position of the artefact, the offset being a difference between the previously stored position and the measured position of the artefact.

An advantage of the first aspect is that, when transitioning from a first machining operation to a second machining operation having a smaller maximum machining tolerance than the first machining operation, an offset is calculated and applied to the second programmed series of movements defining the second machining operation prior to commencement thereof. In this manner, any drift which has occurred within the machine tool, e.g. as a result of heat generated during the first machining operation, is corrected/compensated by applying an offset prior to commencement of the second machining operation. The applied offset will substantially cancel out any misalignment of the machine tool arising due to thermal growth and other factors that may be causing displacement and tilt of the machining head relative to the workpiece holder. The method according to the first aspect is strategically run prior to the maximum tolerance of a machining operation decreasing relative to a previous machining operation, i.e. directly prior to a more critical part of a machining cycle—such as the machining of a particularly challenging or critical feature. In this manner, the method has minimal impact on the total cutting cycle run time since it need not necessarily be performed when it would have little or no beneficial impact on the cutting process, e.g. when such a decrease in maximum tolerance does not occur at a point in a machining cycle. The method does not rely on a plethora of thermal and/or position sensors or a complicated and time-consuming calibration procedure through building up a model of thermal growth in the machining centre. The method does not rely on a sophisticated cooling system, such as a temperature controlled oil shower applied to the spindle area, with associated maintenance and cost/uptime considerations.

Prior to performing the first machining operation, an initial measurement operation may be performed to determine an initial position of the artefact; wherein the machine tool is in a cold state during the initial measurement operation and said previously stored position of the artefact is the initial position of artefact. In this manner, a base operating condition of the machine tool is established prior to commencement of a cutting cycle when the machine tool has been idle for a period of time such that it is in a cold state. During a subsequent cutting operation the machine tool will heat up, potentially causing relative misalignment of the spindle with the workpiece holder, whereby the compensation method of the first aspect will identify and correct any drift from the base operating condition of the machine tool when deemed necessary, e.g. prior to machining a tighter tolerance feature in the workpiece. The machine tool may be in a cold state when at least 10 hours have passed since a prior machining operation.

The machining head and the workpiece holder may be movable relative to one another along mutually orthogonal X, Y and Z axes. The step of performing a measurement operation may comprise measuring, using a probe, X, Y and Z coordinates of one or more pre-determined features on the artefact. The step of calculating an offset may comprise calculating offsets $\Delta X$, $\Delta Y$, $-\Delta Z$ to the X, Y, Z axes respectively by comparing said X, Y and Z coordinates of one or more pre-determined features on the artefact with previously stored corresponding coordinates. In this manner, a 3-axis machine tool may be compensated for drift in any/all of the 3 orthogonal axes X, Y and Z by comparing X, Y and Z coordinates of pre-determined features on the artefact, measured directly prior to commencement of the second machining operation, with previously measured and stored X, Y and Z coordinates of the same, corresponding pre-determined features on the artefact. By measuring corresponding pre-determined features on the artefact with the same probe, one can be confident that any offset which is determined from the measured coordinates is due to actual changes in the machine structure (e.g. due to heating causing tilt/expansion) rather than discrepancies in the positions being probed on the artefact or probing conditions changing. In other words, the artefact defines features which allow for consistent re-probing such that the determined offset can be attributed, with a high degree of confidence, to actual changes in the machine structure.

The machining head and the workpiece holder may be movable relative to one another along mutually orthogonal X, Y and Z axes, and the workpiece holder may be rotatable relative to the machining head about a rotation axis A parallel to the Y axis. The artefact may be on the workpiece holder or on a machine bed of the machine tool. The step of performing a measurement operation may comprise rotating the workpiece holder to a nominal angular position $A_0$ (which may be 90 degrees) relative to the machining head and measuring, using a probe, X, Y and Z coordinates of pre-determined features on the artefact. The step of calculating an offset may comprise calculating offsets $\Delta X$, $\Delta Y$, $\Delta Z$ and $\Delta A$ to the X, Y, Z and A axes respectively by comparing the measured X, Y and Z coordinates of pre-determined features on the artefact or on the workpiece holder with previously stored corresponding coordinates. In this manner, a 4-axis machine tool may be compensated for drift in any/all of the 4 movable axes. The offsets $\Delta X$, $\Delta Y$, $\Delta Z$ may for example be calculated based on an artefact mounted to the machine bed, whereas the $\Delta A$ offset may be calculated based on measurements on the workpiece holder or an artefact mounted thereon.

The workpiece holder may comprise a machine bed and a pallet mounted on the machine bed. The machining head and the workpiece holder may be movable relative to one another along mutually orthogonal X, Y and Z axes, the machine bed may be rotatable relative to the machining head about a rotation axis A parallel to the Y axis, and the pallet may be rotatable relative to the machining head and the machine bed about a rotation axis C, which is parallel to the Z axis when $A=0°$. The artefact may be on the machine bed. The step of performing a measurement operation may comprise: rotating the machine bed to a nominal angular position $A_0$ (which may be 90 degrees) relative to the machining head; measuring, using a probe, X, Y and Z coordinates of pre-determined features on the artefact; rotating the machine bed to a nominal angular position Ai (which may be 0 degrees) relative to the machining head and rotating the pallet to a nominal angular position $C_0$ (which may be 0 degrees) relative to the machining head; and measuring, using the probe, X and/or Y coordinates of the pallet or a second artefact provided on the pallet. The step of calculating an offset may comprise calculating offsets $\Delta X$, $\Delta Y$, $\Delta Z$, $\Delta A$ and $\Delta C$ to the X, Y, Z, A and C axes respectively by comparing the measured X, Y and Z coordinates of pre-determined features on the artefact with previously stored corresponding coordinates, and by comparing the measured X and/or Y coordinates of the pallet or second artefact provided on the pallet with previously stored corresponding coordinates. In this manner, a 5-axis machine tool may be compensated for drift in any/all of the 5 movable axes.

The artefact may comprise a ring gauge and said pre-determined features may comprise positions on an inner cylindrical surface of the ring gauge. Such an artefact is a stable reference and suitable for consistent re-probing. In addition, the inner cylindrical surface allows for the effective centre of the artefact to be determined through probing, thereby enabling a change in the centre of the artefact relative to the machining head to be tracked over time which enables compensation of at least the X and Y axes. The artefact may have a planar upper surface. Such a surface is suitable for probing in the Z direction in order to determine offsets to the Z and A axes.

According to a second aspect there is provided a computer controlled machining centre comprising: a machining head; a workpiece holder; an artefact; and a controller connected to the machining head and workpiece holder, the controller configured to control movement of the machining head relative to the workpiece holder, wherein the controller is configured to perform a method according to the first aspect.

According to a third aspect there is provided a computer program for causing a computer controlled machining centre to perform a method according to the first aspect.

According to a fourth aspect there is provided a computer-readable storage medium comprising a computer program which, when executed on a computer controlled machining centre according to the second aspect, performs the method according to the first aspect. The computer-readable storage medium may be a non-transitory computer readable medium such as a disc-based or integrated circuit (IC)-based read only memory (ROM). The disc-based ROM may for example be an optical or magnetic disc. The IC-based ROM may for example be a non-volatile storage medium such as a flash memory or other type of solid-state memory.

According to a fifth aspect there is provided a method of machining a workpiece using a machine tool comprising a machining head and a workpiece holder moveable relative to one another the method comprising: controlling performance of a first machining operation on the workpiece according to a first programmed series of movements of the machining head relative to the workpiece holder, the first machining operation having a first maximum machining tolerance; controlling performance of a second machining operation on the workpiece according to a second programmed series of movements of the machining head relative to the workpiece holder, the second machining operation having a second maximum machining tolerance; controlling performance of a measurement operation to determine a position of an artefact on the machine tool; calculating an offset relative to a corresponding previously stored position of the artefact; and applying the offset to the second programmed series of movements prior to controlling performance of the second machining operation, wherein the second maximum machining tolerance is smaller than the first maximum machining tolerance.

According to a sixth aspect there is provided a computer program that, when read by a controller, causes performance of the method according to the first aspect.

According to a seventh aspect there is provided a non-transitory computer-readable storage medium comprising computer readable instructions that, when read by a controller, cause performance of the method according to the first aspect.

According to an eighth aspect there is provided a controller for a computer controlled machining centre, the controller being configured to perform the method according to the first aspect.

BRIEF DESCRIPTION

Embodiments will now be described by way of example only, with reference to the Figures, in which.

DETAILED DESCRIPTION

Typical CNC machine tools support translation of a machining head relative to a workpiece holder along three mutually orthogonal axes X, Y and Z. Some machine tools also support rotation of the workpiece holder relative to the machining head around one or more axes, such as rotation around A and C axes parallel to the Y and Z axes respectively. The total number of movable axes for a multi-axis machine typically varies between three and six, with possible additional axes stated according to additional degrees of freedom of the workpiece or the machine tool.

Figure 1:
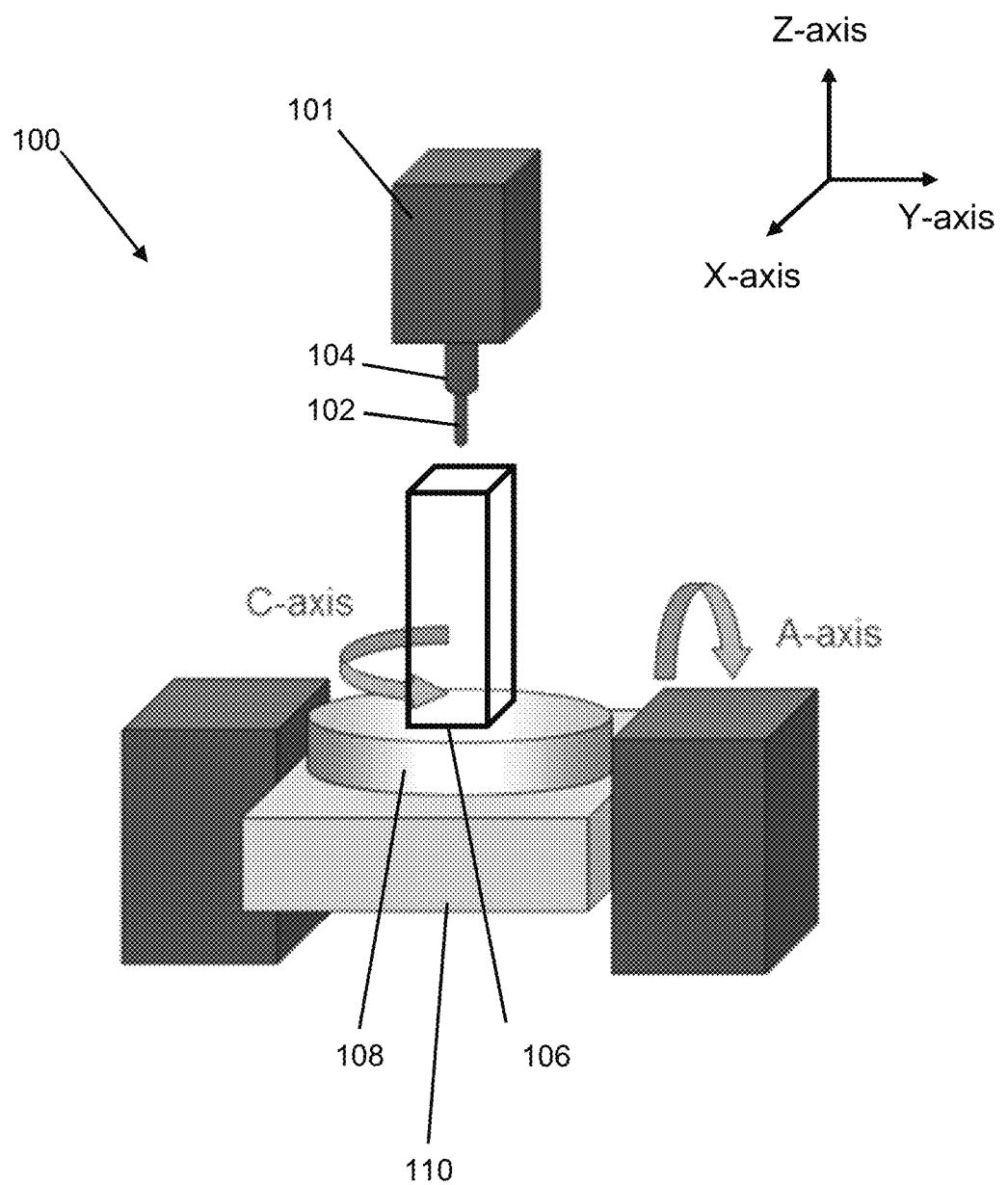
FIG. 1 is a diagram of a 5-axis machine tool including X, Y and Z linear axes and A and C rotation axes.

Salient components of an exemplary 5-axis machine tool 100 are depicted in FIG. 1. A machining head 101 includes a spindle 104 which supports a cutting tool 102 or alternatively a measurement probe. The machining head 101 can move relative to the workpiece 106 being machined along mutually orthogonal X, Y and Z linear axes. The workpiece 106 is held on a workpiece holder 108, also known as a pallet, which is itself located on the machine bed 110. The machining head 101 may move only along the Z axis whilst the pallet 108 and/or machine bed 110 translates along the X and Y axes. Alternatively, the pallet 108 and machine bed 110 may not make any translational movement and the machining head itself 101 may instead provide movement along all three of the X, Y and Z axes. In this example, the machine bed 110 can rotate about the A axis, which is parallel to the Y axis (i.e. rotation around the Y axis), whilst the pallet 108 rotates relative to the machine bed 110, and therefore relative to the machining head 101, about the C axis, which is parallel to the Z axis (i.e. rotation around the Z axis). In this manner, a cutting tool 102 or probe mounted in the spindle of the machining head 101 can process and measure five sides of the workpiece 106 in a single setup. This is because, relative to the cutting tool or probe, the workpiece 106 can be moved along or about five axes.

Whilst the following examples are primarily based on a 5-axis machine tool, it will be appreciated that aspects of the present disclosure are also applicable to machine tools having greater than or fewer than five axes.

Figure 2:
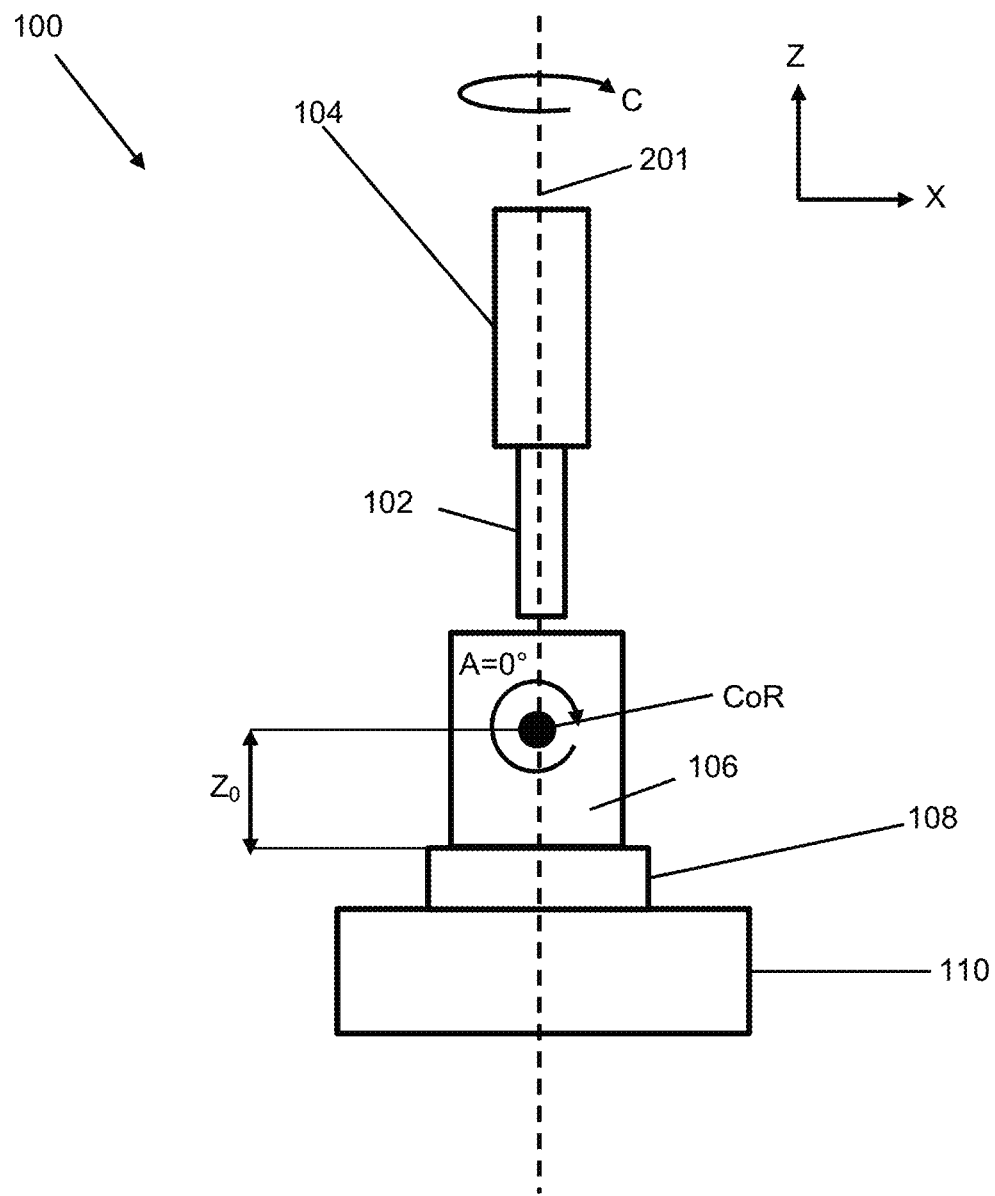
FIG. 2 is a schematic view of the spindle area of a 5-axis machine tool showing the centre of rotation relative to the machine bed and the spindle.

FIG. 2 is a schematic view of the spindle area of an example 5-axis machine tool 100 forming part of a machining centre. The A axis of rotation is perpendicular to the plane of the page whilst the C rotation axis is indicated by the vertical broken line 201. The machine bed 110 is rotated to an angle A=0 degrees, such that the workpiece holder 108 is aligned parallel to the X-Y plane. The intersection of the A and C axes (and additionally the B axis for a 6-axis machine) may be considered to define a centre of rotation (CoR), which is an effective pivot point about which the machine bed 110 and pallet 108 rotate. When the machine tool 100 is supplied by the manufacturer an initial calibration may be provided that defines the X, Y and Z coordinates of the centre of rotation. Conventionally, the centre of rotation is located some set distance $Z_0$ above the top surface of the pallet 108, for example around 20 mm.

Figure 3:
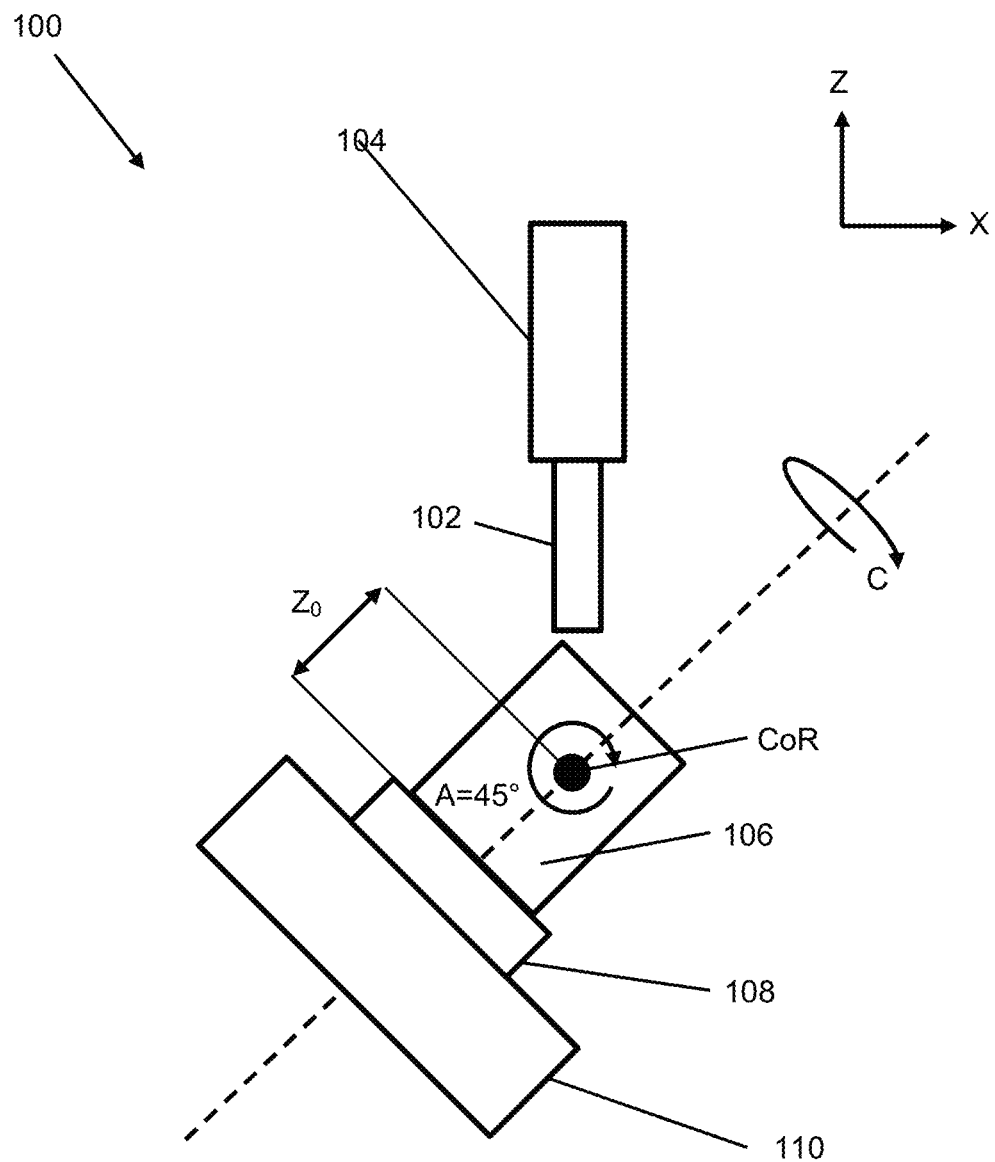
FIG. 3 is a schematic view of the spindle area of a 5-axis machine tool where the machine bed is at an angle A=45 degrees relative to the spindle.

FIG. 3 illustrates the machine tool of FIG. 2 where the machine bed 110 has rotated about the A axis by 45 degrees.

Figure 4:
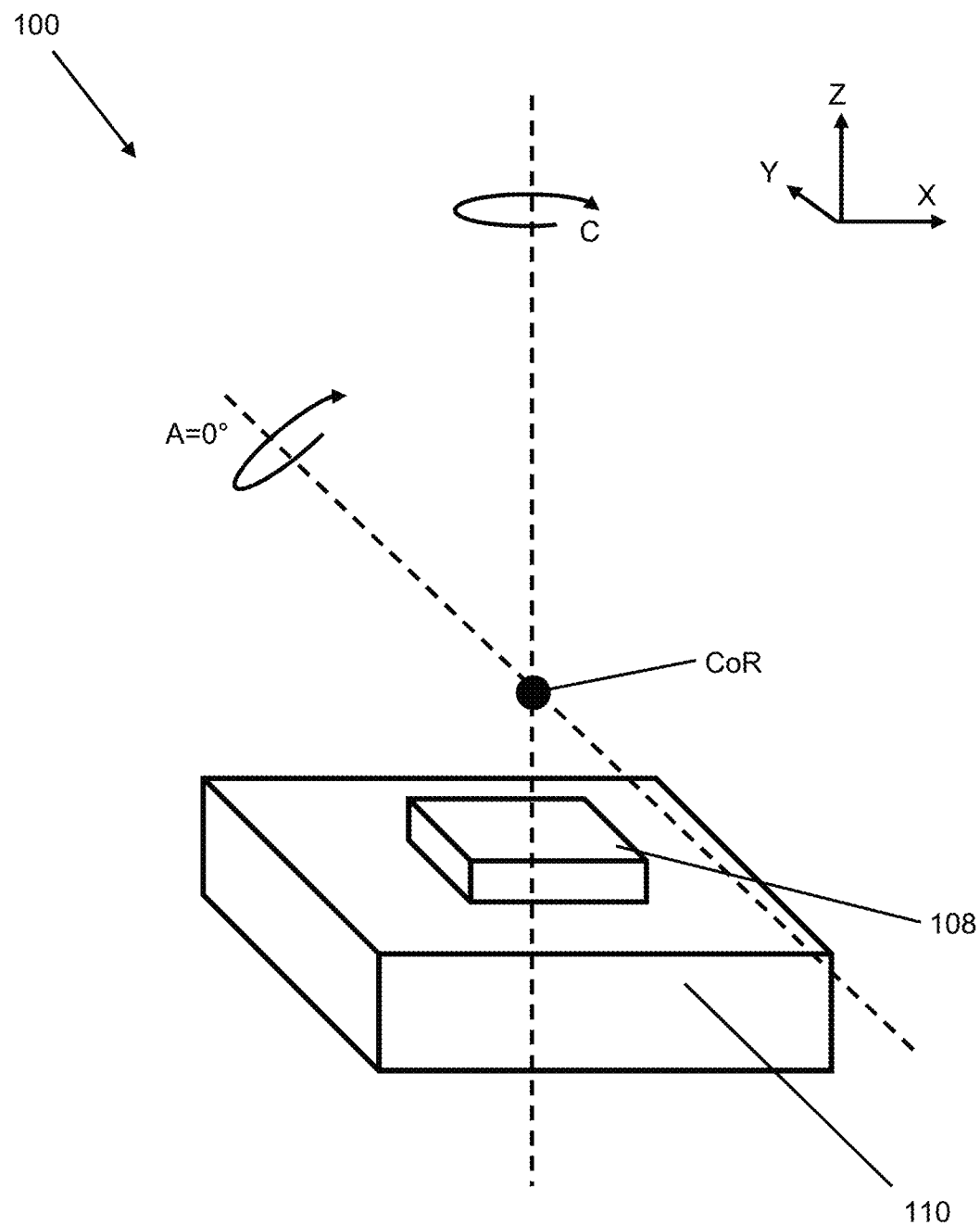
FIG. 4 is a perspective view of a machine bed and pallet of a 5-axis machine tool, indicating the A and C axes of rotation and their intersection at the centre of rotation.

FIG. 4 is a perspective view illustrating the A and C axes, the centre of rotation CoR, the machine bed 110 and pallet 108.

It should be appreciated that the centre of rotation is a conventional reference point in the field of multi rotational axis machine tools. However, for the purposes of the present disclosure the actual position of the centre of rotation is not necessarily a concern. Instead, the present disclosure is concerned with defining one or more fixed reference points which may be revisited one or more times during a machining cycle in order to identify drifts/offsets occurring within the machine tool. It should be appreciated that compensation of such offsets will automatically correct any offset in the spindle X, Y, Z coordinates relative to the centre of rotation.

Figure 5:
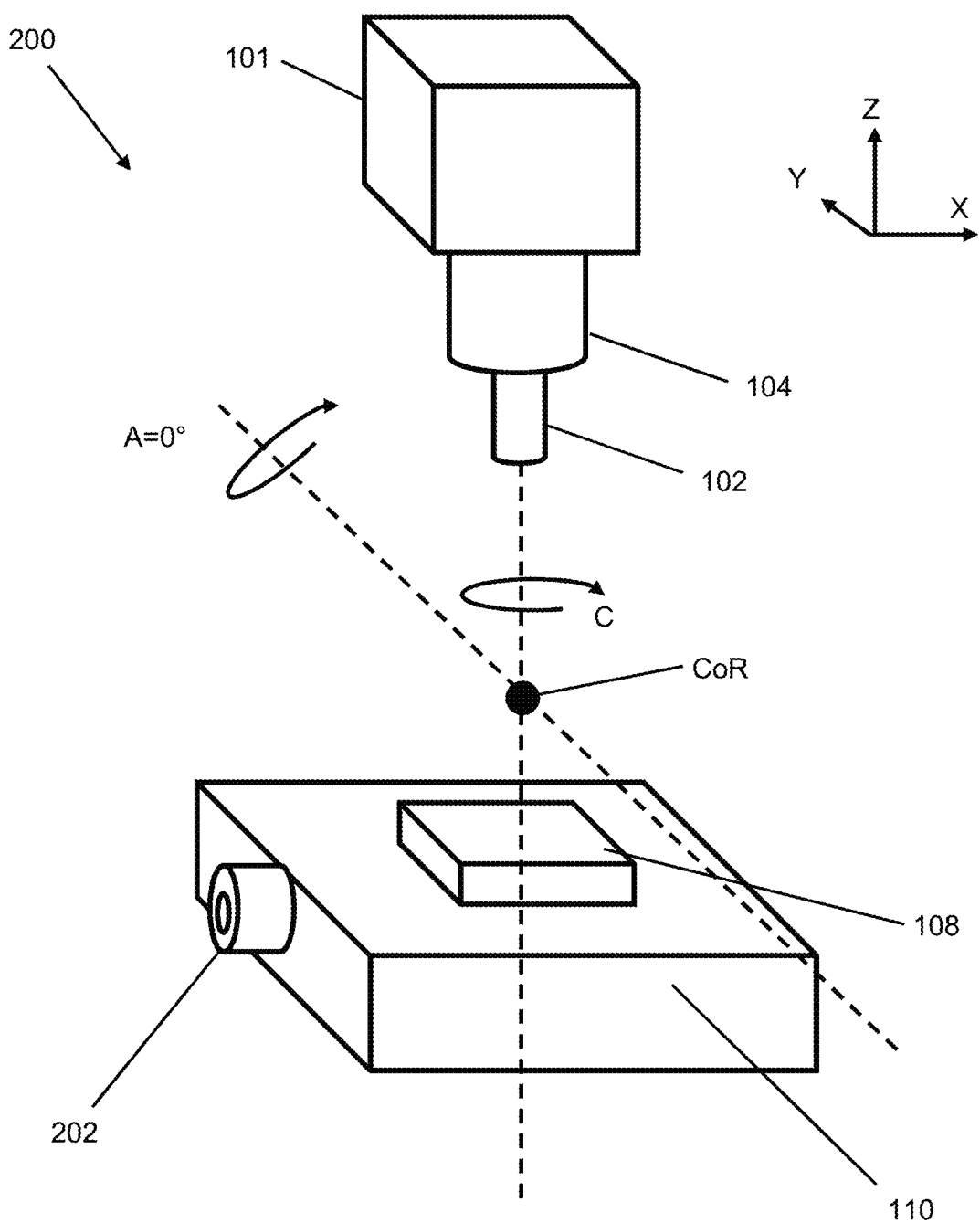
FIG. 5 is a perspective view of a machine bed and pallet of a 5-axis machine tool, where the machine bed has an artefact mounted thereon.

With reference to FIG. 5, according to the present disclosure a 5-axis machine tool 200 has an artefact 202 fixedly located on the machine bed 110 which, as described above, rotates about the A axis. The artefact 202 typically comprises a test piece of known dimensions contained within some housing.

Figure 6:
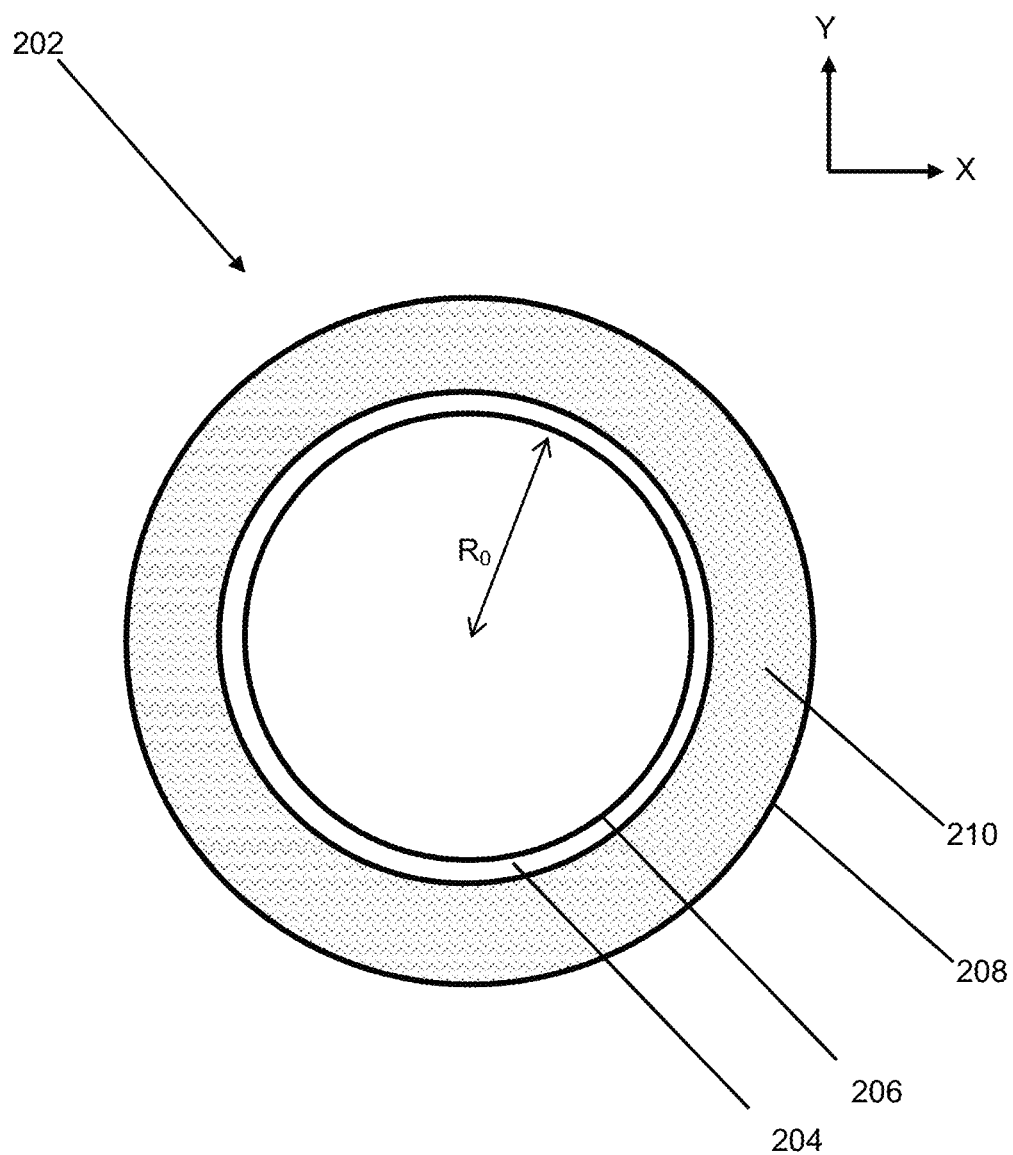
FIG. 6 illustrates an artefact.

According to the present disclosure the artefact 202, illustrated in plan view in FIG. 6, is in the form of a ring gauge 204 of inner radius Ro defining an inner cylindrical surface 206. The inner radius Ro may be in the range from 15 mm to 100 mm, and typically between 15 mm and 30 mm. The ring gauge is secured in an outer cylindrical housing 208 having a planar upper surface 210 which is arranged to be facing outwards from the side of the machine bed 110 to which the artefact 202 is mounted. It should be appreciated that the artefact 202 may take on other forms and dimensions to those described herein. For example, the artefact could be provided by a set of known features machined directly into the machine bed or provided on the machine bed by a manufacturer. The artefact 202 according to the present disclosure can be retrofitted to an existing machine tool with minimal disruption or risk of damaging the machine tool. Furthermore, the artefact 202 may be mounted to a different part of the machine tool, for example the pallet 108 or a surface of the machine tool enclosure.

Figure 7:
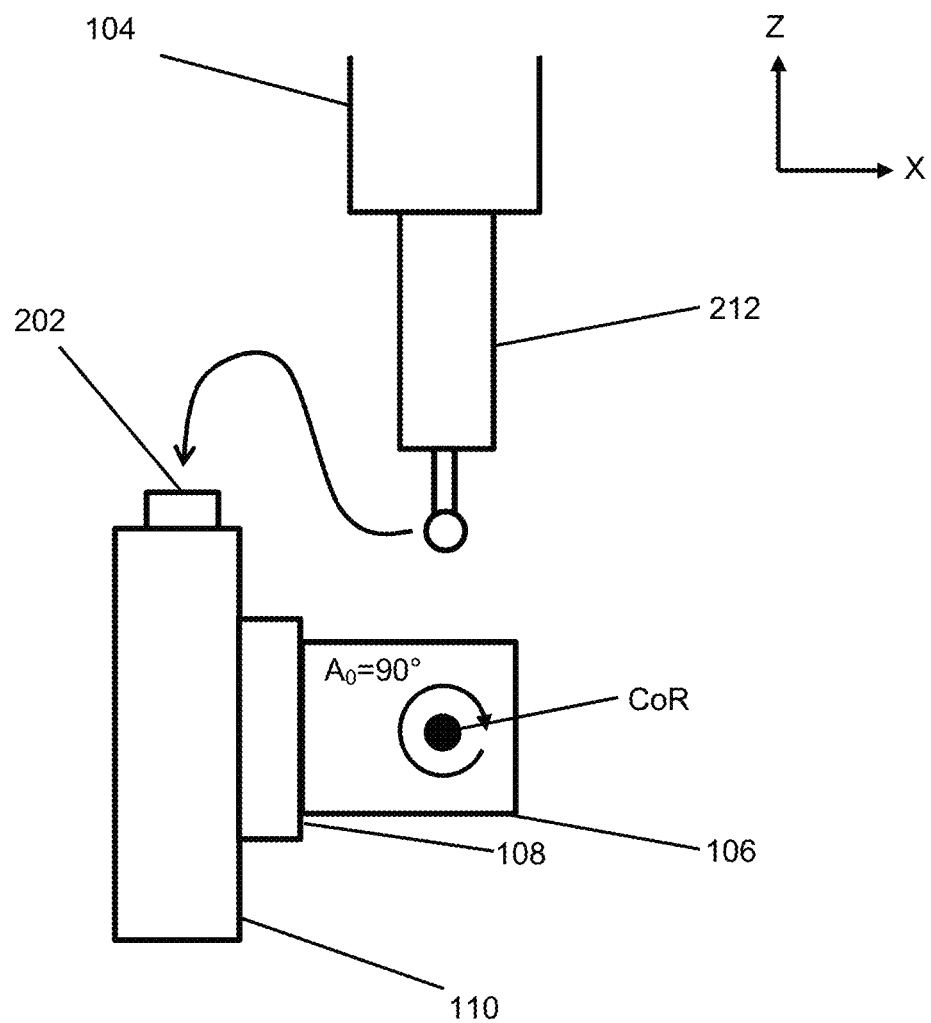
FIG. 7 illustrates part of a compensation procedure performed on a 5-axis machine tool with the machine bed at an angle A=90 degrees relative to the spindle.

According to the present disclosure, at certain pre-determined points during a cutting cycle, for example when transitioning from a first machining operation to a second machining operating having a smaller maximum tolerance than that of the first machining operation, the cutting tool 102 is replaced by a probe 212, such as a Renishaw contact probe. The machine bed 110 is rotated to a nominal angular position $A_0$ relative to the machining head. In one example the machine bed is rotated to a nominal angle of $A_0$=90 degrees such that, as illustrated in FIG. 7, the planar upper surface 210 of the artefact 202 is facing upwards towards measurement probe 212.

It should be noted that the term "nominal" used herein, e.g. to refer to the angular positions of the machine bed and pallet at certain points during the compensation procedure, should be understood to mean the angle to which the machine tool is programmed to move. This will not necessarily correspond to the actual physical angle to which the machine tool moves due to small offsets resulting from machine tool drift from thermal effects and the like. It is these offsets which the present disclosure seeks to identify and compensate at strategic points in a cutting cycle. For example, the program defining a cutting routine may request an angle A=30.20° at a particular stage in the cutting cycle. However, because of an offset ΔA=0.01° which has arisen in the machine tool since the last calibration, the actual, physical angle of the machine bed relative to the spindle will be A=30.21° instead of A=30.20°. However, as far as the machine tool is concerned it is at a nominal angle A=30.20°—thus there is a disconnect between the actual physical state of the machine (reality) and what the machine tool control system indicates the state of the machine tool to be. This may result in defects in the workpiece being machined if the maximum tolerance at that stage in the cutting cycle is sufficiently small that the offset ΔA=0.01° which has arisen due to drift will have an appreciable effect on those machined features having that maximum tolerance. The same applies mutatis mutandis to offsets in the X, Y, Z and C axes (and B axis for a 6-axis machine tool).

Figure 8:
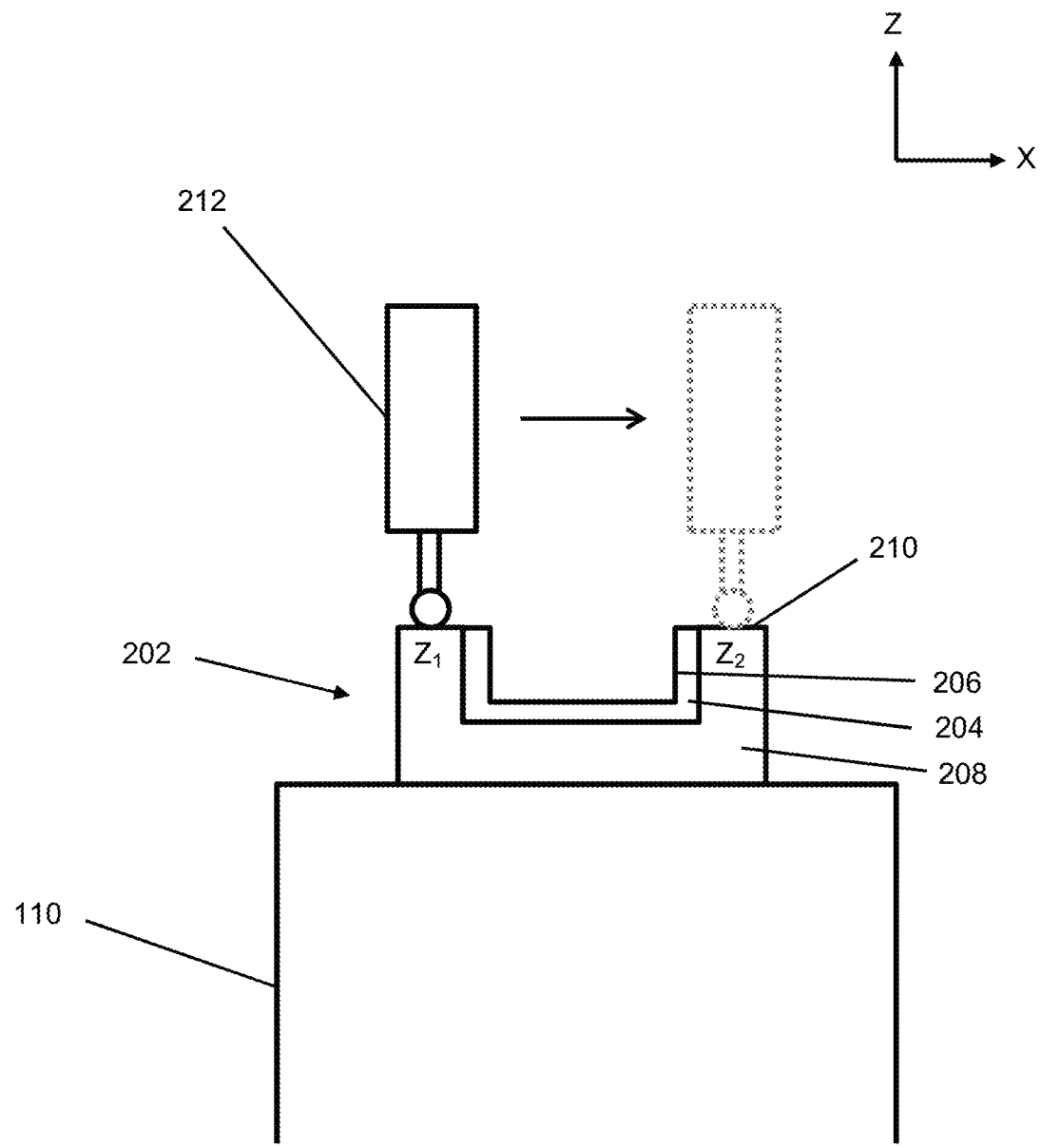
FIG. 8 illustrates the probing of laterally spaced positions on a top, planar surface of the artefact in order to determine offsets to the Z and A axes.

FIG. 8 illustrates a close-up cut-away view of the artefact 202 with the machine bed 110 rotated to the nominal angle $A_0$=90 degrees, such that the planar upper surface 210 of the artefact 202 is nominally parallel to the X-Y plane. The measurement probe 212 is programmed to measure a pair of Z coordinates $Z_1$ and $Z_2$ at pre-defined laterally separated positions on the planar upper surface 210 of the artefact 202. From the measured values $Z_1$ and $Z_2$, and knowing the lateral (X, Y) separation between the two probing points, the angle of the planar upper surface 210 of the artefact can be determined, as well as an average Z axis offset. The angle can be compared against a previously stored angle of the artefact planar upper surface 210 determined at a previous point in time by the same manner, i.e. by rotating the machine bed 110 to the same nominal angle $A_0$=90 degrees, and measuring a pair of Z coordinates, $Z_1$ and $Z_2$, with the probe 212. From the comparison between the previously stored measurements and the new measurements an offset ΔA to the rotation axis A can be calculated. This offset is a direct and accurate estimate of how much the A axis of the machine tool has moved, relative to the spindle/machining head, since the previous time the artefact 202 was visited and probed. A comparison between the newly measured pair of Z coordinates, $Z_1$ and $Z_2$, and the previously stored pair of Z coordinates also enables an offset ΔZ to the Z axis to be calculated in a direct manner. The previous measurements against which the new measurements are compared may have been a set of measurements made with the machine tool in a cold state, e.g. at least 10 hours since a previous cutting operation was performed.

Figure 9:
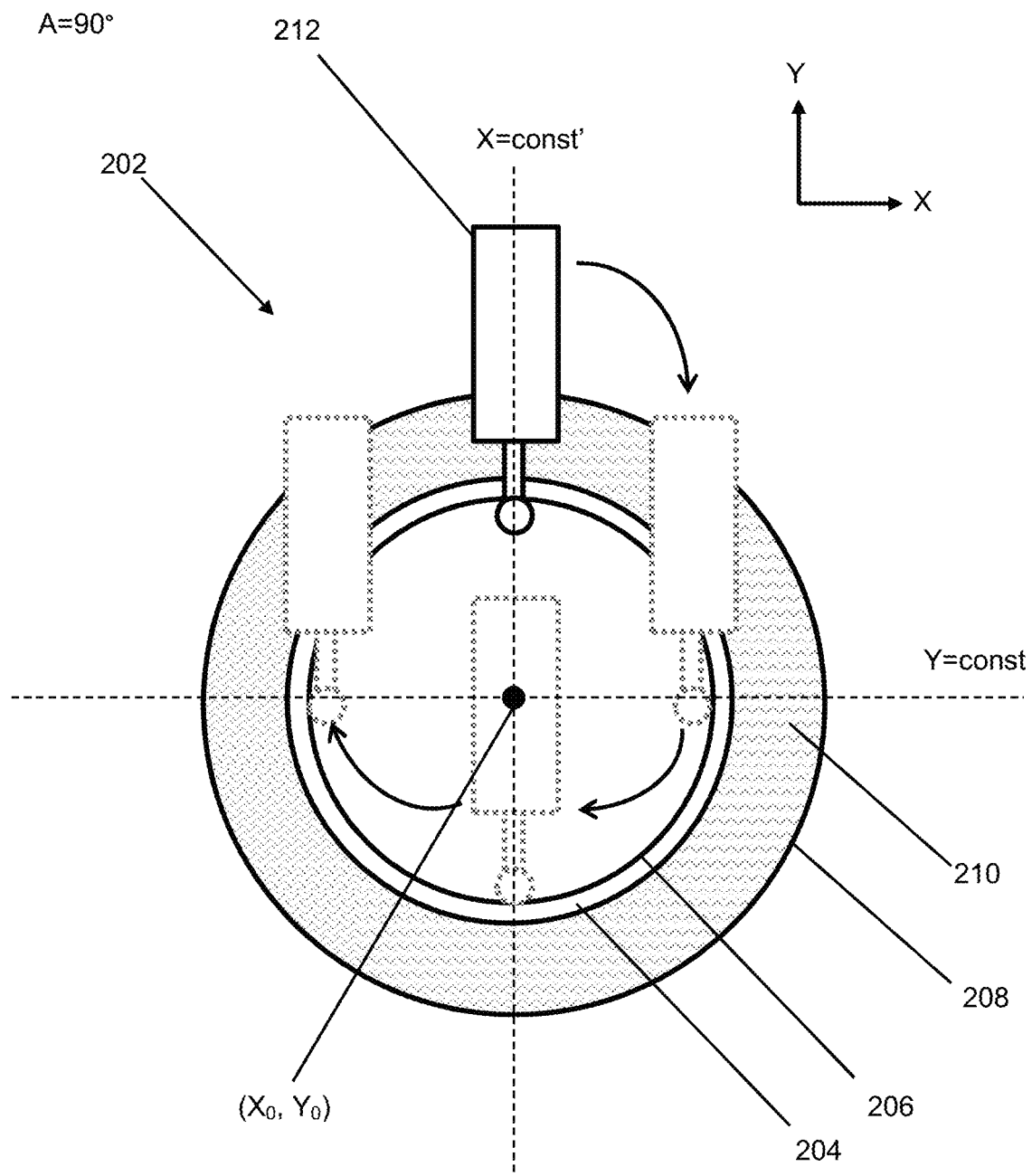
FIG. 9 illustrates the probing of positions around an inner cylindrical surface of the artefact used to determine the centre of the artefact and determine offsets to the X and Y axes.

As illustrated in the top down view of FIG. 9, with the machine bed still at the nominal angle $A_0$=90 degrees, the probe 212 additionally measures the X and Y coordinates at four positions around and on the inner cylindrical surface 206 of the artefact 202. For example, it measures the X coordinates at which the probe touches diametrically opposed regions of the inner cylindrical surface along a line of constant Y (Y=const in FIG. 9) and it measures the Y coordinates at which the probe touches diametrically opposed regions of the inner cylindrical surface along a line of constant X (X=const' in FIG. 9). From these measurements, one possibility is to determine the centre position $(X_0, Y_0)$ of the artefact (which is possible because it is cylindrically symmetrical) and to subsequently compare the determined centre position against a previously stored centre position of the artefact determined in the same manner, i.e. with the machine bed rotated to the same nominal angle $A_0$=90 degrees and probing four points around the inner cylindrical surface of the artefact as described above. A comparison between the newly determined centre position $(X_0, Y_0)$ and the previously stored centre position enables both an X and Y offset, ΔX and ΔY respectively to be calculated. It will be appreciated that the lines X=const' and Y=const do not need to intersect at the actual centre position $(X_0, Y_0)$. Provided they intersect within the inner bore of the artefact then it is possible to determine the centre position by taking the average of two X coordinates (for a line of constant Y) and two Y coordinates (for a line of constant X) at which the probe touches the inner cylindrical surface of the artefact.

It will be appreciated that, when using a ring gauge or other circular feature as part of the artefact, a minimum of three measurement points are required to determine the centre and diameter of the circular feature, from which the X and Y coordinates of a reference point of the artefact, for example the centre point of the circular feature, can be readily determined. Measuring more points around the circular feature may improve the accuracy of the coordinates.

Figure 10:
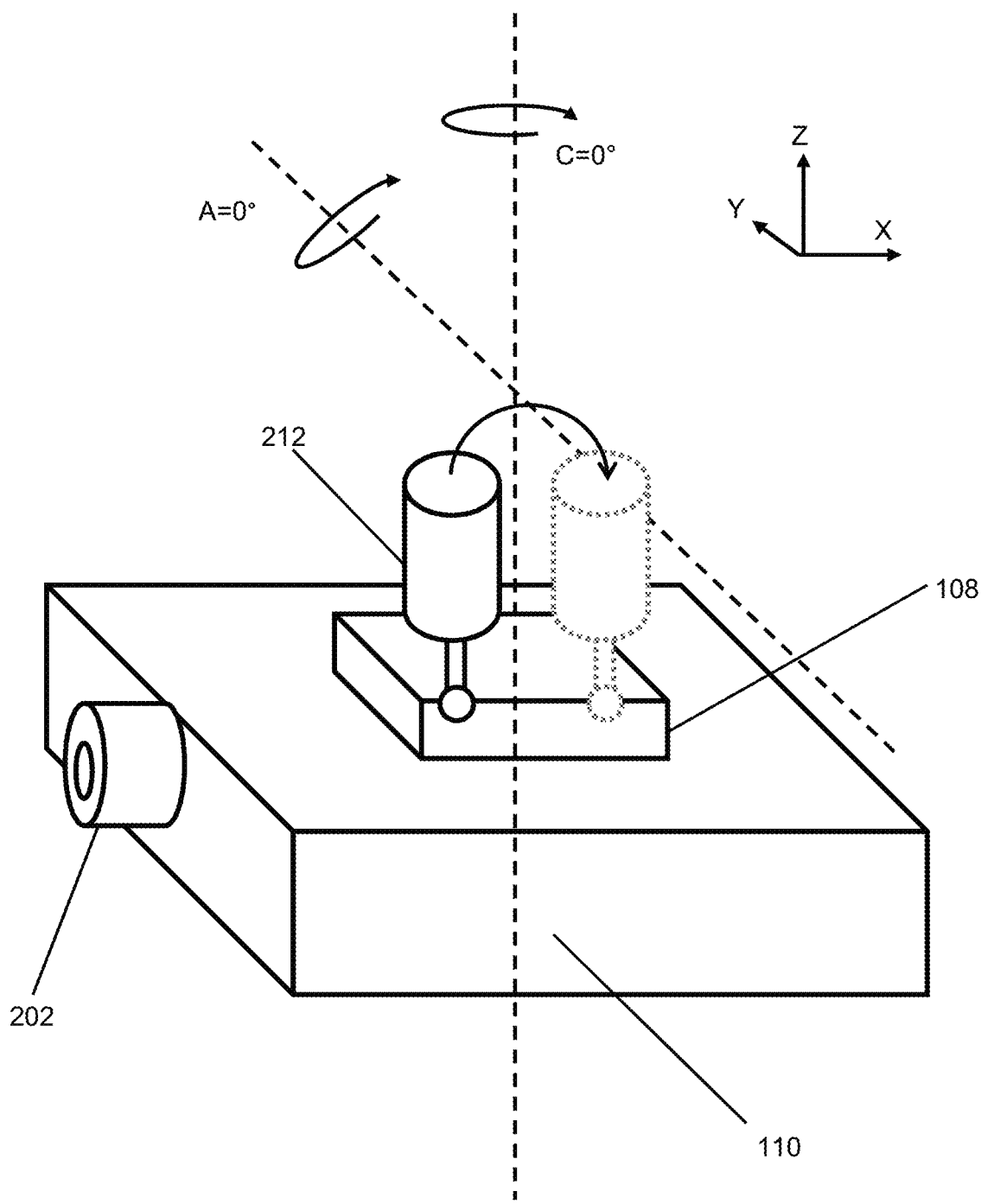
FIG. 10 illustrates the probing of the pallet of the machine tool in order to determine an offset to the C axis.

Up to this point the procedure has determined offsets ΔX, ΔY, ΔZ and ΔA with respect to the X, Y, Z and A axes which can be applied to a subsequent programmed set of movements of the machining head in order to compensate for drift in the machine tool. However, according to this example, the artefact 202 is mounted to the machine bed 110 and is therefore not susceptible to the C axis rotation and consequently any offset ΔC of the C axis. Therefore, according to this disclosed example, the pallet 108 itself (or alternatively another artefact/test piece mounted to the pallet) may be probed using the probe 212 in order to determine the offset ΔC. Specifically, the machine bed 110 is rotated back to a nominal angle A=0 degrees such that the machine bed 110 and pallet 108 are substantially horizontal, i.e. aligned with the X-Y plane. Then, as illustrated in FIG. 10, with the pallet rotated to a nominal angle of C=0 degrees the probe 212 measures X and Y positions of at least two locations along an edge of the pallet 108, or alternatively along the edge of a flat artefact (not shown) mounted to the edge of the pallet 108. In this manner the angle of the edge of the pallet 108, or flat artefact, can be determined from the X and Y position measurements and compared against a previously determined angle of the pallet 108 measured in the same manner. This then allows an offset ΔC to the C axis to be determined in a similar manner to how the offset ΔA to the A axis is determined.

The procedure outlined above with reference to FIGS. 5 to 10 allows offsets (relative to previously stored measurements) of all 5 axes of the 5-axis machine tool to be determined at a chosen point in a cutting cycle. The determined offsets are then applied to a subsequent programmed series of movements of the machining head relative to the workpiece holder, thereby substantially cancelling out any drift of the machine tool as a result of thermal growth or other effects that may cause a repeatable tilt/displacement of the spindle relative to the workpiece holder. Other effects such as mechanical knocks to the machine tool, or swarf contamination may result in displacements or tilts that are either not repeatable or result in errors exceeding a permitted limit. Repeating the measurement cycle may allow for non-repeatable offsets to be identified, while offsets that exceed a permitted limit may result in the machining process being halted. The offsets may be calculated with respect to an initial set of measurements on made on the artefact/pallet when the machine tool is in a cold state, e.g. when the machine tool has been static for a period of 10 hours or more and in a recognised specification of kinematic alignment.

Figure 11:
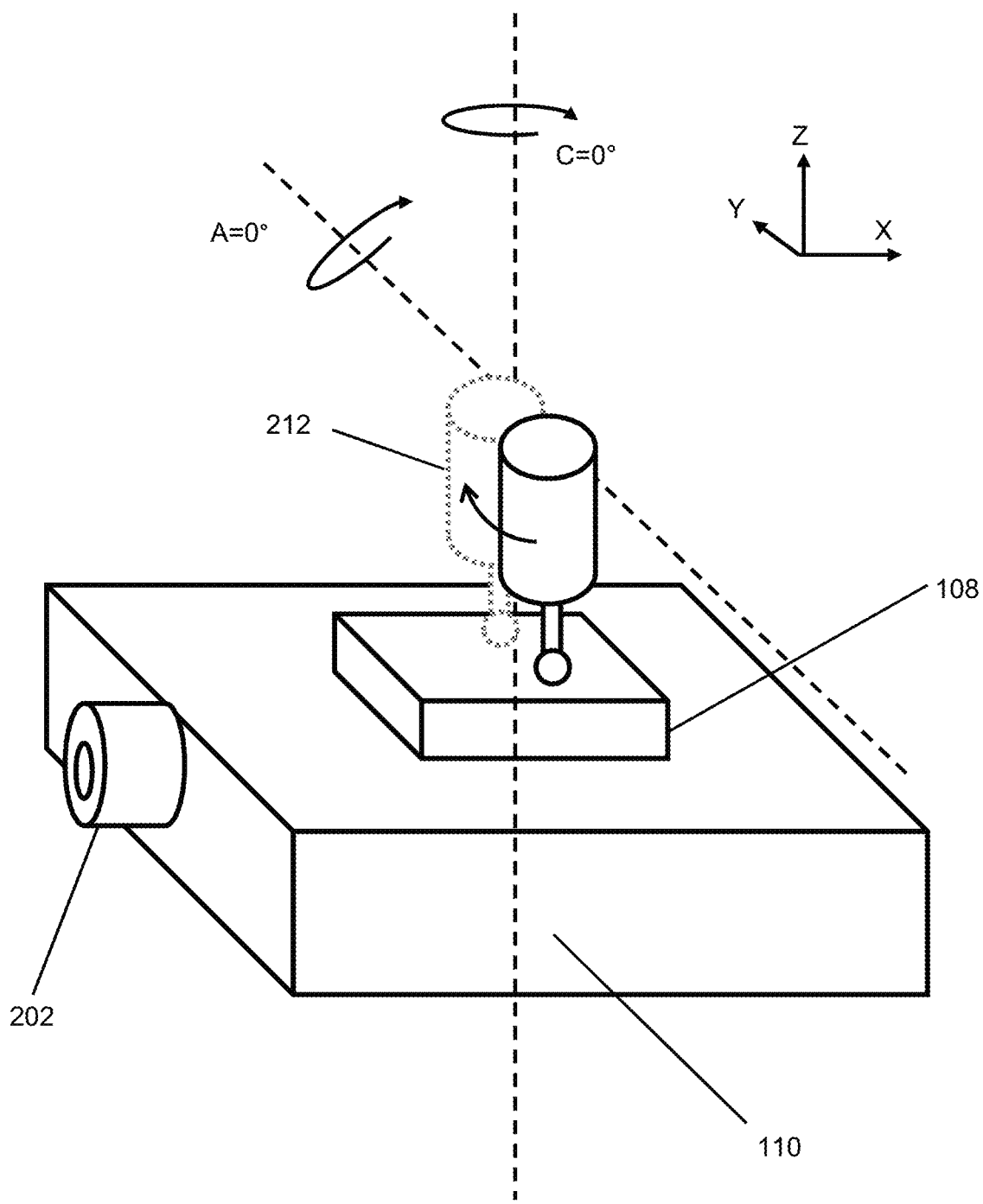
FIG. 11 illustrates the probing of the pallet of the machine tool in order to determine an error in a fixed B axis.

For a 5-axis machine tool, whilst the B axis (parallel to the X axis in this example) is not rotatable by design, it may nevertheless be subject to minor variation with respect to the spindle over time. Therefore, the procedure disclosed herein may additionally determine an error or offset ΔB to the B axis. This can be done with the A axis in the nominal position A=0 degrees and the C axis in the nominal position C=0 degrees. In these positions, the probe 212 measures the Z values at a number of points on the top surface of the pallet 108 separated in the Y direction along a line of constant X. This is illustrated in FIG. 11. From these measurements an offset ΔB to the B axis can be determined by comparing the measured Z positions against previously stored positions measured in the same manner. Similar considerations may apply to a 3-axis machine where it may be desirable to keep track of offsets to the A, B and C axes even those these are fixed and are not designed to move in the 3-axis machine. The offset ΔB may then can be compensated for through Euler angle calculation and adaptive correction through the A axis.

Figure 12:
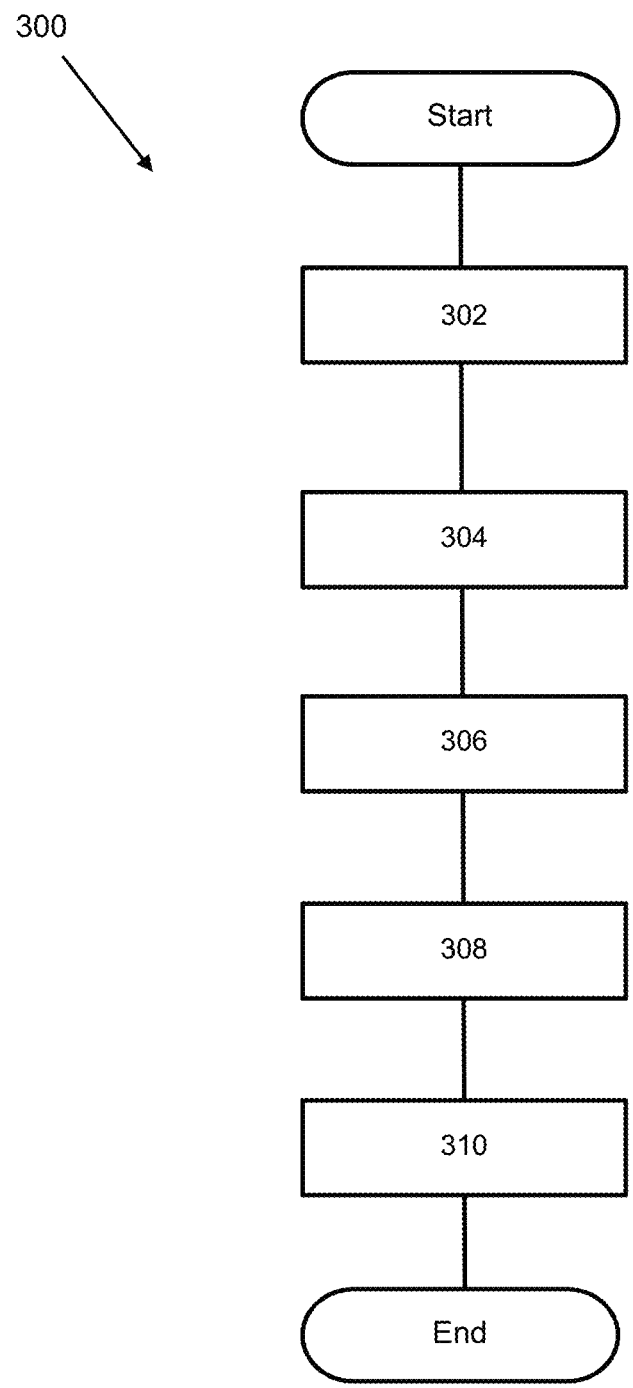
FIG. 12 is a flowchart corresponding to a compensation method according to the present disclosure.

FIG. 12 illustrates a method 300 in accordance with the present disclosure. Specifically, FIG. 12 is a flow chart corresponding to a method of machining a workpiece using a machine tool comprising a machining head and a workpiece holder moveable relative to one another. The method is applicable to machine tools of varying number of axes, including 3 axis machine tools with no rotational movement.

At step 302 a first machining operation is performed on the workpiece according to a first programmed series of movements of the machining head relative to the workpiece holder, the first machining operation having a first maximum machining tolerance. At step 310 a second machining operation is performed on the workpiece according to a second programmed series of movements of the machining head relative to the workpiece holder, the second machining operation having a second maximum machining tolerance which is smaller than the first maximum machining tolerance. At step 304, which is performed after step 302 and before step 310, a measurement operation is performed to determine a position of an artefact on the machine tool. Then, at step 306 an offset relative to a previously stored corresponding position of the artefact is calculated. Then at step 308 the calculated offset is applied to the second programmed series of movements prior to performing the second machining operation at step 310. Steps 304, 306 and 308 are performed sequentially after step 302 and before step 310.

Application of the compensation procedure disclosed herein to a Matsuura MAM-42V 5-axis machining centre has resulted in a reduction in machine variation, i.e. drift in machine origins over time due to heating effects and other environmental influences, from approximately 40 μm without compensation to approximately 5 μm using the procedure described herein. This has resulted in a reduction in the variation of machined parts/workpieces from approximately 70 μm to approximately 12 μm. In this manner the number of defective machined parts has been reduced substantially. These results are based on inspection measurements of key dimensions for over 1000 machined parts.

Figure 13:
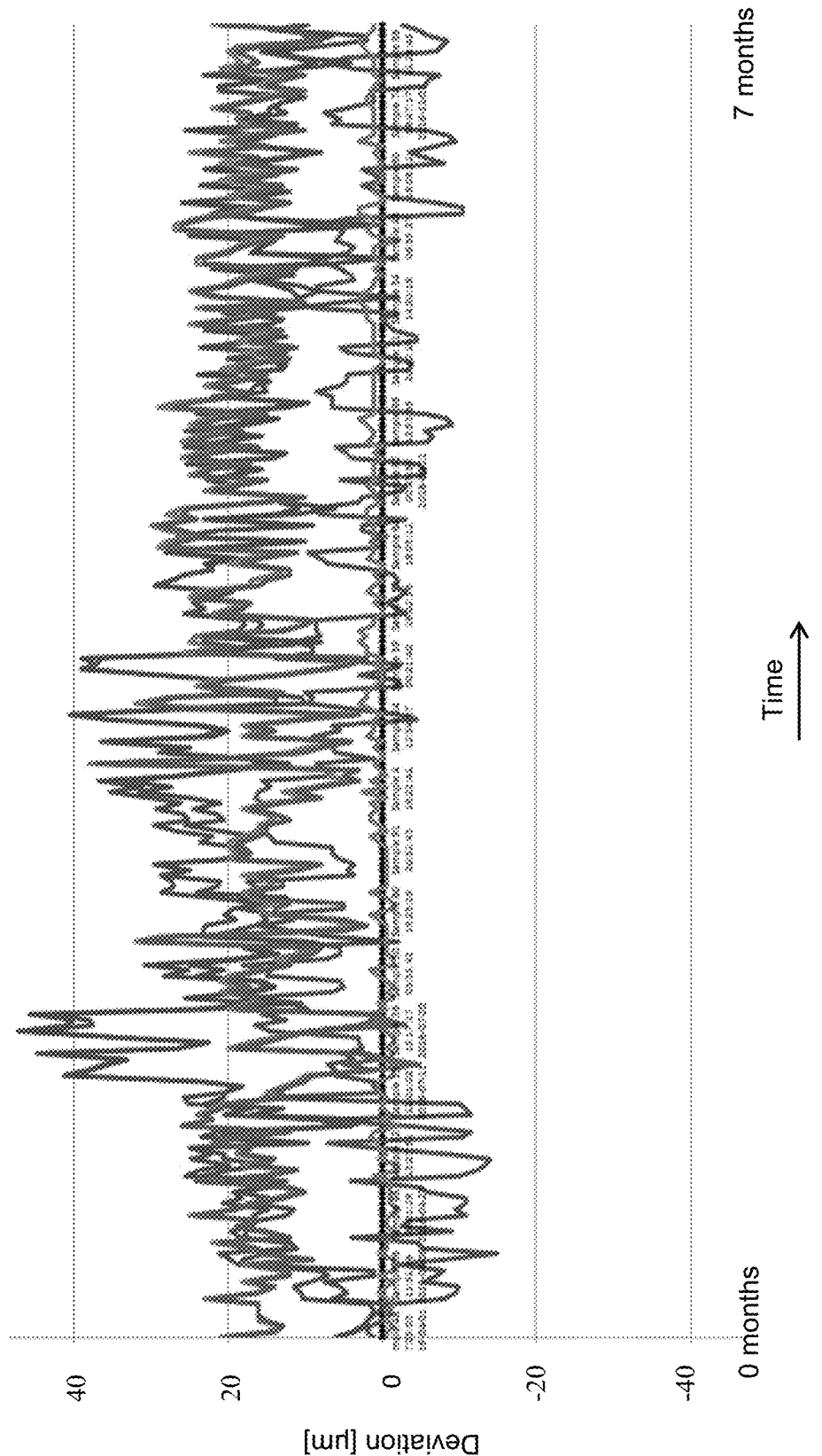
FIG. 13 illustrates the performance of a machine tool which is not compensated.
Figure 14:
FIG. 14 illustrates the performance of a machine tool which is compensated according to the compensation method disclosed herein.

FIG. 13 illustrates the performance of a machine tool which is not compensated according to the compensation procedure disclosed herein. The vertical axis represents the deviation of different features from their intended positions in μm (represented by each line in the series) whilst the horizontal axis represents a sequence of machining operations over a seven month period. FIG. 14 illustrates the performance of the same machine tool when it is compensated according to the compensation procedure disclosed herein. The vertical axis has the same scale as the plot of FIG. 13. As is evident from the comparison between FIGS. 13 and 14, the compensation procedure significantly improves the deviation, from deviations of around +40/−10 μm to a maximum deviation of around +7/−3 μm.

It will be appreciated that, depending on the particular features being machined, it may be sufficient to compensate fewer axes of the machine tool than are actually available for movement. For example, if a particular feature to be machined is known to be critically sensitive to offset in the A axis but not critically sensitive to offsets in the other axes, the steps described herein to calculate and apply an offset to the A axis may be performed without further steps to correct the X, Y, Z and C axes. In this manner the compensation procedure may require less time to complete.

It will also be appreciated that statements such as the A axis being parallel to the Y axis arise as a result of the particular coordinate system used in the present disclosure to describe and define degrees of freedom of the machine tool. However, other coordinate systems could be chosen which have a direct mapping to the coordinate system used herein. The operating principles of aspects of the present disclosure are independent of the particular choice of coordinates used to describe/define movement of the machine tool since a coordinate system is not a physical entity but rather a mathematical construct with reference to which positions, translations and rotations may be defined and described.

Figure 15:
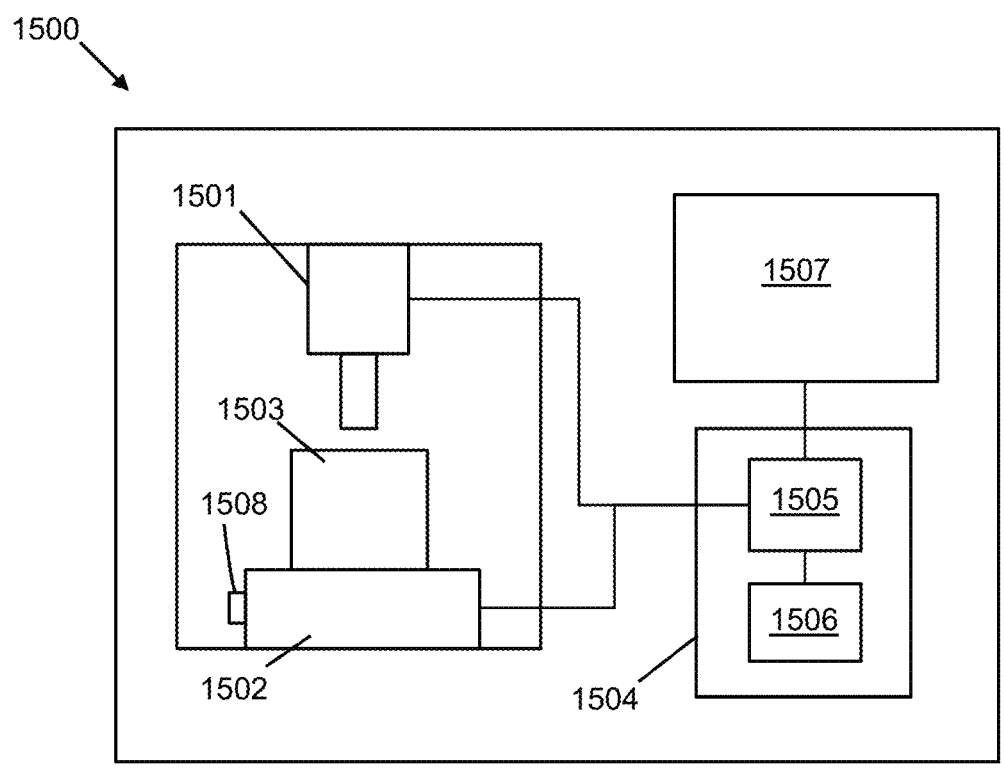
FIG. 15 is a schematic diagram illustrating an example computer controlled machining centre.

FIG. 15 illustrates an example of a computer-controlled machining centre 1500 comprising a machining head 1501, a workpiece holder 1502, on which a workpiece 1503 is mounted, and a controller 1504. An artefact 1508 is mounted on the workpiece holder 1502. The controller 1504 is connected to the machining head 1501 and workpiece holder 1502 to control movement of the machining head 1501 relative to the workpiece holder 1502.

The controller 1504 may comprise a processor 1505 and a memory 1506, and is connected to an input/output (I/O) device 1507 such as a display screen and keyboard (which may be integrated into a single unit such as a touchscreen). The memory 1506, or a part thereof, may be provided on a non-transitory computer readable storage medium such as a disc-based or IC-based ROM on which a computer program is stored that comprises instructions to cause the controller 1504 to operate the machining centre 1500 according to the methods described herein.

In other examples, the controller 1504 may additionally or alternatively comprise: control circuitry; and/or processor circuitry; and/or at least one application specific integrated circuit (ASIC); and/or at least one field programmable gate array (FPGA); and/or single or multi-processor architectures; and/or sequential/parallel architectures; and/or at least one programmable logic controller (PLC); and/or at least one microprocessor; and/or at least one microcontroller; and/or a central processing unit (CPU); and/or a graphics processing unit (GPU), that is configured to perform the methods.

The machining centre 1500 may for example be a Matsuura MAM-42V 5-axis machining centre or other type of computer controlled machining centre with greater or fewer axes.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

It will be understood that the invention is not limited to the embodiments above-described and various modifications and improvements can be made without departing from the concepts herein. Except where mutually exclusive, any of the features may be employed separately or in combination with any other features and the disclosure extends to and includes all combinations and sub-combinations of one or more features described herein.

I claim:

1. A method of machining a workpiece using a machine tool comprising a machining head and a workpiece holder moveable relative to each another, the method comprising:

performing a first machining operation on a workpiece mounted to the workpiece holder according to a first programmed series of movements of the machining head relative to the workpiece holder, the first machining operation having a first machining tolerance;

performing a second machining operation on the workpiece according to a second programmed series of movements of the machining head relative to the workpiece holder, the second machining operation having a second machining tolerance;

performing a measurement operation to determine a position of an artefact on the machine tool;

calculating an offset relative to a corresponding previously stored position of the artefact; and applying the offset to the second programmed series of movements prior to performing the second machining operation, wherein the second machining tolerance is smaller than the first machining tolerance, the determination of the position of the artefact in the measuring operation includes determination of a center position of the artefact by averaging a plurality of detected positions of the artefact, and the offset is a difference between a previously stored center position of the artefact and the calculated center position of the artefact.

2. The method according to claim 1, further comprising, prior to performing the first machining operation, performing an initial measurement operation to determine an initial position of the artefact, wherein the machine tool is in a cold state during the initial measurement operation and said previously stored position of the artefact is the initial position of artefact.

3. The method according to claim 2, wherein at least 10 hours have passed since a prior machining operation when performing the initial measurement operation.

4. The method according to claim 1, wherein the machine tool is configured to move the machining head and the workpiece holder relative to each another along mutually orthogonal X, Y and Z axes, the step of performing the measurement operation comprising measuring, using a probe, features on the artefact to determine X, Y and Z coordinates of the artefact, the step of calculating the offset comprising calculating offsets $\Delta X$, $\Delta Y$, $\Delta Z$ to the X, Y, Z axes respectively by comparing said determined X, Y and Z coordinates of the artefact with previously stored corresponding coordinates.

5. A computer controlled machining centre comprising:
a machining head;
a workpiece holder;
an artefact; and
a controller connected to the machining head and workpiece holder, the controller configured to control movement of the machining head relative to the workpiece holder,
wherein the controller is configured to perform the method according to claim 1.

6. A non-transitory computer-readable storage medium comprising computer readable instructions that, when read by a controller, cause performance of the method as claimed in claim 1.

7. A method of machining a workpiece using a machine tool comprising a machining head and a workpiece holder moveable relative to each another, the method comprising:

performing a first machining operation on a workpiece mounted to the workpiece holder according to a first programmed series of movements of the machining head relative to the workpiece holder, the first machining operation having a first machining tolerance;

performing a second machining operation on the workpiece according to a second programmed series of movements of the machining head relative to the workpiece holder, the second machining operation having a second machining tolerance;

performing a measurement operation to determine a position of an artefact on the machine tool;

calculating an offset relative to a corresponding previously stored position of the artefact; and applying the offset to the second programmed series of movements prior to performing the second machining operation, wherein the second machining tolerance is smaller than the first machining tolerance, and the machine tool is configured to move the machining head and the workpiece holder relative to each another along mutually orthogonal X, Y and Z axes and to rotate the workpiece holder relative to the machining head about a first rotation axis A, the step of performing the measurement operation comprising measuring, using a probe, pre-determined features on the artefact to determine X, Y and Z coordinates and an orientation about the A axis of the artefact, the step of calculating the offset comprising calculating offsets ΔX, ΔY, ΔZ and ΔA to the X, Y, Z and A axes respectively by comparing said determined X, Y and Z coordinates and orientation about the A axis with previously stored corresponding coordinates and orientation.

8. The method according to claim 7, wherein the artefact comprises a ring gauge and said pre-determined features comprise positions on an inner cylindrical surface of the ring gauge.

9. A method of machining a workpiece using a machine tool comprising a machining head and a workpiece holder moveable relative to each another, the method comprising:
performing a first machining operation on a workpiece mounted to the workpiece holder according to a first programmed series of movements of the machining head relative to the workpiece holder, the first machining operation having a first machining tolerance;
performing a second machining operation on the workpiece according to a second programmed series of movements of the machining head relative to the workpiece holder, the second machining operation having a second machining tolerance;
performing a measurement operation to determine a position of an artefact on the machine tool;
calculating an offset relative to a corresponding previously stored position of the artefact; and
applying the offset to the second programmed series of movements prior to performing the second machining operation, wherein
the second machining tolerance is smaller than the first machining tolerance, and
the machine tool comprises a machine bed on which the workpiece holder is mounted, the artefact being on the machine bed, the machine tool being configured to move the machining head and the workpiece holder relative to each another along mutually orthogonal X, Y and Z axes, to rotate the machine bed relative to the machining head about a first rotation axis A and to rotate the workpiece holder relative to the machining head about a second rotation axis C orthogonal to the first rotation axis A, the step of performing a measurement operation comprising:
measuring, using a probe, pre-determined features on the artefact to determine X, Y and Z coordinates and an orientation about the A axis of the artefact;
measuring, using the probe, features on the workpiece holder to determine an orientation of the workpiece holder about the C axis, and
the step of calculating the offset comprises calculating offsets ΔX, ΔY, ΔZ, ΔA and ΔC to the X, Y, Z, A and C axes respectively by comparing said determined X, Y and Z coordinates and orientation about the A axis on the artefact and said determined orientation of the workpiece holder about the C axis with previously stored corresponding coordinates and orientations.

10. The method according to claim 9 wherein:
the step of measuring X, Y and Z coordinates of one or more pre-determined features on the artefact comprises measuring a pair of Z coordinates at laterally separated positions on a planar surface of the artefact to determine the orientation about the A axis of the artefact and the Z coordinate of the artefact; and measuring X and Y coordinates around a cylindrical surface of the artefact to determine the X and Y coordinates of the artefact; and
the step of calculating the offset comprises:
calculating an offset ΔA to the rotation axis A by comparing said determined orientation about the A axis with a previously stored orientation;
calculating offsets ΔX and ΔY to the X and Y axes respectively by calculating a change in the determined X and Y coordinates of the artefact relative to previously stored X and Y coordinates;
calculating an offset ΔZ to the Z axis by calculating a difference between the determined Z coordinate of the artefact and a previously stored Z coordinate of the artefact; and
calculating an offset ΔC to the rotation axis C by comparing said determined orientation of the workpiece holder with a previously stored orientation of the workpiece holder.

* * * * *